US010664605B2

(12) United States Patent
Roesler

(10) Patent No.: US 10,664,605 B2
(45) Date of Patent: May 26, 2020

(54) INTERFACE COORDINATION

(71) Applicant: UtilityAPI

(72) Inventor: Daniel Roesler, Oakland, CA (US)

(73) Assignee: UtilityAPI, Oakland, CA (US)

(*) Notice: Subject to any disclaimer, the term of this patent is extended or adjusted under 35 U.S.C. 154(b) by 136 days.

(21) Appl. No.: 15/838,160

(22) Filed: Dec. 11, 2017

(65) Prior Publication Data
US 2018/0114029 A1 Apr. 26, 2018

Related U.S. Application Data

(63) Continuation of application No. PCT/US2016/037629, filed on Jun. 15, 2016.

(60) Provisional application No. 62/180,005, filed on Jun. 15, 2015.

(51) Int. Cl.
| | |
|---|---|
| G06F 21/00 | (2013.01) |
| G06F 21/60 | (2013.01) |
| G06Q 50/06 | (2012.01) |
| G06F 9/46 | (2006.01) |
| G06F 21/31 | (2013.01) |
| G06Q 10/10 | (2012.01) |
| H04W 12/04 | (2009.01) |
| H04W 12/08 | (2009.01) |
| H04L 9/08 | (2006.01) |
| H04W 12/06 | (2009.01) |

(52) U.S. Cl.
CPC ............ *G06F 21/602* (2013.01); *G06F 9/46* (2013.01); *G06F 21/31* (2013.01); *G06Q 10/10* (2013.01); *G06Q 50/06* (2013.01); *H04W 12/04* (2013.01); *H04W 12/08* (2013.01); *H04L 9/08* (2013.01); *H04W 12/06* (2013.01)

(58) Field of Classification Search
CPC .......... G06F 21/602; G06F 21/31; G06F 9/46; H04W 12/08; H04W 12/04; H04W 12/06; G06Q 50/06; G06Q 10/10; H04L 9/08
See application file for complete search history.

(56) References Cited

U.S. PATENT DOCUMENTS

| | | | | |
|---|---|---|---|---|
| 2010/0251339 A1* | 9/2010 | McAlister | ............. | H04L 63/104 726/4 |
| 2011/0238855 A1* | 9/2011 | Korsunsky | ............. | G06F 21/55 709/231 |
| 2012/0329475 A1* | 12/2012 | Ribaudo | ............... | G01S 5/0018 455/456.1 |

(Continued)

OTHER PUBLICATIONS

Lee et al., "Energy Service Interface: Accessing to Customer Energy Resources for Smart Grid Interoperation", IEEE Journal on Selected Areas in Communications, vol. 31, Issue: 7, Jul. 2013.*

(Continued)

*Primary Examiner* — Morshed Mehedi
(74) *Attorney, Agent, or Firm* — DLA Piper LLP (US)

(57) ABSTRACT

Systems and methods here include providing ways for a third party to obtain authorization via electronic form to interact with a utility on a utility account holder's behalf, locate and collect the account holder's energy usage and billing data and process and store the data using high security measures. This system is able to dynamically generate and process different types of authorization and varied scope for interacting with public utilities.

17 Claims, 14 Drawing Sheets

(56) References Cited

U.S. PATENT DOCUMENTS

| | | | |
|---|---|---|---|
| 2015/0046985 A1* | 2/2015 | D'Souza | H04L 63/08 |
| | | | 726/4 |
| 2015/0120224 A1* | 4/2015 | Siebel | G01R 21/00 |
| | | | 702/61 |
| 2015/0339572 A1* | 11/2015 | Achin | G06N 5/02 |
| | | | 706/46 |

OTHER PUBLICATIONS

Neisse et al., "Implementing Trust in Cloud Infrastructures", 2011 11th IEEE/ACM International Symposium on Cluster, Cloud and Grid Computing, Date of Conference: May 23-26, 2011.*

* cited by examiner

Add a Utility Account (p...)

🔒 URL

Example Solar

Complete this form to securely share your utility bill and usage data with:
- solar@example.com from Example Solar Email: ex. johndoe@example.com Utility: Pacific Gas and Electric (PG&E) ▾
 — 340
- Please select your utility
- Pacific Gas and Electric (PG&E)
- Southern California Edison (SCE)
- San Diego Gas and Electric (SDG&E)

Tip: Use an old bill to find this information

Full name: [ ]
Or company name

See example
PG&E account #: [ ]
Full PG&E account number.

PG&E phone #: [ ]
— 350
The phone number associated with the PG&E account.

See example
PG&E meter #: [ ]
For commercial, enter 1 meter associated with the account.

---

Digital Signature

I, [Full Name], am the owner of this utility account, and I authorize Example Solar and Company, Inc. to access this account to collect bill and usage data according to the Terms of Service. This data will not be shared with any other third party.

🔒
[ SECURELY SHARE MY UTILITY DATA ]

FIG. 3B

420 *Example Solar*

URL 410

430 Complete this form to securely share your utility bill and usage data with:
- solar@example.com from Example Solar Email: ex. johndoe@example.com Utility: Please select your utility 440 Digital Signature I, Full Name , am the owner of this utility account, and I authorize Example Solar and UtilityAPI, Inc. to access this account to collect bill and usage data according to the Terms of Service. This data will not be shared with any other third party.

SECURELY SHARE MY UTILITY DATA powered by UtilityAPI

SHARE YOUR PORTAL

SETTINGS (CUSTOMERIZE YOUR PROTAL)

510:
- GENERAL | APPEARANCE | API
- Portal URL  *edit*
- https://utilityapi.com/portal/example_solar 520:
- Afterwards
- After the user completes, cancels, or errors.
- Send an email to
- ☑ solar@example.com
- Get a notification of the user's action to the provided email.

530:
- Redirect to
- ☐ https://www.example.com
- You can have the user land on a customer page after they've submitted their credentials

PREVIEW

*Example Solar*

Complete this form to securely share your utility bill and usage data with:
- solar@example.com from Example Solar Email: [ex.johndoe@example.com]

Utility: [Please select your utility ▾]

Digital Signature

I, [Full Name], am the owner of this utility account, and I authorize Example Solar and UtilityAPI, Inc. to access this account to collect bill and usage data according to the Terms of Service. This data will not be shared with any other third party.

🔒 SECURELY SHARE MY UTILITY DATA powered by UtilityAPI

FIG. 6

Example Solar

710

Complete this form to securely share your utility bill and usage data with:
- solar@example.com from Example Solar Email: heatherhomeowner@test.com edit Utility: PG&E edit 720 {
- Full name: Heather Homeowner edit
- PG&E account #: 123456789-0 edit
- PG&E phone #: 555-555-5555 edit
- PG&E meter #: 0987654321 edit
}

Digital Signature

I, [Full Name], am the owner of this utility account, and I authorize Example Solar and UtilityAPI, Inc. to access this account to collect bill and usage data according to the Terms of Service. This data will not be shared with any other third party.

🔒 SECURELY SHARE MY UTILITY DATA powered by UtilityAPI

FIG. 7

SHARE YOUR PORTAL

Prefilled Portal Link  ← back

Fill in the form to the right to create a pre-filled form that you can send to a customer.

preview

URL  810  Copy to a new preset  SAVED

Cancel

☑ EMAIL PREFILLED LINK

Try a demo

SETTINGS (CUSTOMIZE YOUR PORTAL)

---

*Example Solar*

PREFILL MODE  830

Complete this form to securely share your utility bill and usage data with:
- solar@example.com from Example Solar Email: heatherhomeowner@test.com  edit Utility: PG&E  edit Full name: Heather Homeowner  edit PG&E account #: 123456789-0  edit PG&E phone #: 555-555-5555  edit PG&E meter #: 0987654321  edit

820

Digital Signature

I, [Full Name], am the owner of this utility account, and I authorize Example Solar and UtilityAPI, Inc. to access this account to collect bill and usage data according to the Terms of Service. This data will not be shared with any other third party.

FIG. 8

UtilityAPI - Utility Accou...

← → URL ▼ ⟳ | 🔍 Search

| MY ACCOUNTS | ⊕ ADD NEW ACCOUNT | MY CUSTOMER PORTAL | DOCS ✱ |

Your portal: https://utilityapi.com/portal/example_solar (customize)

My Accounts

Download this page: csv • json

7 Accounts

Filter accounts [ ex: "Heather", "123 Main St", or "123456789 - 🔍 ]   ⊕ ADD NEW

---

Heather Homeowner (DEMO)   view details >   Download all bills: csv

| SAID | Contact | Address | Tariff | Latest Status | | Bills | Intervals |
|---|---|---|---|---|---|---|---|
| 1234567890 | Heather Homeowner | 123 Main St #100, Anytown, CA 94612 | E1 XB Reside... | Activate to collect data→ | [Activate] | 1020 Bills Last updated 8 minutes ago. | Intervals No data yet. |

1010

--- test (DEMO)   view details >   Download all bills: csv

| SAID | Contact | Address | Tariff | Latest Status | | Bills | Intervals |
|---|---|---|---|---|---|---|---|
| 1234567890 | Heather Homeowner | 123 Main St #100, Anytown, CA 94612 | E1 XB Reside... | Activate to collect data→ | [Activate] | Bills Last updated 23 days ago. | Intervals No data yet. |

--- test2 (DEMO)   view details >   Download all bills: csv

| SAID | Contact | Address | Tariff | Latest Status | Bills | Intervals |
|---|---|---|---|---|---|---|
| 1234567890 | Heather Homeowner | 123 Main St #100, Anytown, CA 94612 | E1 XB Reside... | 23 days ago-Data refreshed restart | 13 (1 year) Last updated 23 days ago. csv • latest pdf csv • xml | 52 (2.1 days) Last updated 3 months ago. |

---

3rd Party (DEMO)   view details >   Download all bills: csv

FIG. 10

| | A | B | C | D | E | F | G | H | I | J | K | L | M |
|---|---|---|---|---|---|---|---|---|---|---|---|---|---|
| 1 | auth | auth_expires | auth_type | created | latest_message | latest_time | latest_type | login | modified_message | modified_ti | tiuid | user_uid | utility |
| 2 | H. Home.. | 2018-06-14T22:28:35.09 | owner | 2015-06-15 | Services refreshed | 2015-06-15 | updated | credentials | No modifications since cr | 2015-06-15 | 5816 | 1450 | DEMO |
| 3 | test | 2018-05-22T03:54:21.57 | owner | 2015-05-23 | Services refreshed | 2015-05-23 | updated | credentials | Updated utility, owner na | 2015-05-23 | 5607 | 1 | DEMO |
| 4 | test2 | 2018-05-22T03:52:53.90 | owner | 2015-05-23 | Services refreshed | 2015-05-23 | updated | credentials | No modifications since cr | 2015-05-23 | 5606 | 1 | DEMO |

FIG. 11

INTERFACE COORDINATION

CROSS REFERENCE TO RELATED CASES

This application claims priority under 35 U.S.C. § 120 to and is a continuation of PCT international patent application PCT/US16/37629 filed 15 Jun. 2016, which claims priority from U.S. provisional application 62/180,005 filed 15 Jun. 2015, which are hereby incorporated by reference in their entirety.

TECHNICAL FIELD

This application relates to the field of data exchanges, storage, networked interfaces and security. Specifically, this application relates to interfaces between utility customers and utilities along with automated interaction with utilities after authorization.

BACKGROUND

Utility customers or account holders are being increasingly approached by third party energy service companies, such as solar and energy efficiency companies, to perform energy upgrades or analyses of that utility account holder's utility usage or billing history. Examples of these services include, but are not limited to, installing and monitoring solar panels on a utility account holder's house or office building, performing energy or water audits of a facility to facilitate energy efficiency upgrades, monitoring a building's energy usage over time, and installing energy storage devices at a home or facility.

Before performing these services, the third party usually performs a feasibility analysis to determine whether the service is worth pursuing. Part of the input for these analyses is a utility account holder's utility usage and billing data. This input is needed to produce a proposal that compares the current cost of their utility usage and what their cost would be with the service. Similarly, after a service is performed, the data may be required to monitor and verify the performance of the asset. However, collecting and monitoring this input data is often a complex series of manual steps for the utility account holder. Utility account holders often become frustrated or disinterested in the third party service because the process of collecting the input data needed for the feasibility analysis takes so long or is too complex leading to lost sales and increasing the cost and time required to close a sale. Alternatively, because the data collection process is troublesome, third party services will sometimes estimate the input data for their proposal analyses, which can lead to inaccurate or overly conservative results and a service or project not being pursued because it is mistakenly thought to be inviable.

SUMMARY

Systems and methods here include embodiments including using a computer server with a processor and memory in communication with a network and a data storage, the computer server configured to run two separated stacks, the first stack including, a data queue to receive a job and pass the job to one of a plurality of data workers, the data worker to pass the job onto a collector queue, the second stack including, a collector queue to receive the job and pass the job to one of a plurality of collector workers, the collector worker to, interact with a data holder and retrieve data regarding the job, retrieve the data regarding the job, and cause storage of the data regarding the job in an encrypted storage. Alternatively or additionally, the server is further configured to receive over the network and process an authorization form from a utility account holder. Alternatively or additionally, the authorization form includes a login and password to access an account at the data holder for the utility account holder. Alternatively or additionally, the computer server encrypts the login and password before storing it in the data storage. Alternatively or additionally, the second stack has no encrypt permission. Alternatively or additionally, the first stack has no decrypt permission. Alternatively or additionally, the data worker is further configured to read the data regarding the job in the encrypted storage as the data regarding the job is being written by the collector worker. Alternatively or additionally, the collector worker is further configured to parse the retrieved data regarding the job to the data queue through a whitelist application program interface. Alternatively or additionally, the data worker is further configured to cause storage of the results in the data storage. Alternatively or additionally, the data holder is a utility company. Alternatively or additionally, the data regarding the job is one of utility billing information or utility power usage information. Alternatively or additionally, the authorization form includes pre-filled information and a digital signature block. Alternatively or additionally, the authorization form includes sub-options including at least one of time limited, data scope limited, account registry, share limited. Alternatively or additionally, the server generates a receipt upon retrieval of the data regarding the job. Alternatively or additionally, the receipt includes at least one of, date, time, registration details, authorizee details, data collected details, data shared details, or revoke options.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 3B shows an example dynamic form generation for specific utilities according to certain embodiments described herein.

FIG. 4 shows an example stylized form with third party logo according to certain embodiments described herein.

FIG. 5 shows an example customization interface for the third party according to certain embodiments described herein.

FIG. 6 shows an example customization interface for the third party (continued) according to certain embodiments described herein.

FIG. 7 shows an example pre-populated form view according to certain embodiments described herein.

FIG. 8 shows an example customization interface for the pre-populated form view according to certain embodiments described herein.

FIG. 10 shows an example generated interaction results viewable by the third party according to certain embodiments described herein.

FIG. 11 shows an example receipt in API format (csv data structure) according to certain embodiments described herein.

DETAILED DESCRIPTION

Figure 1:
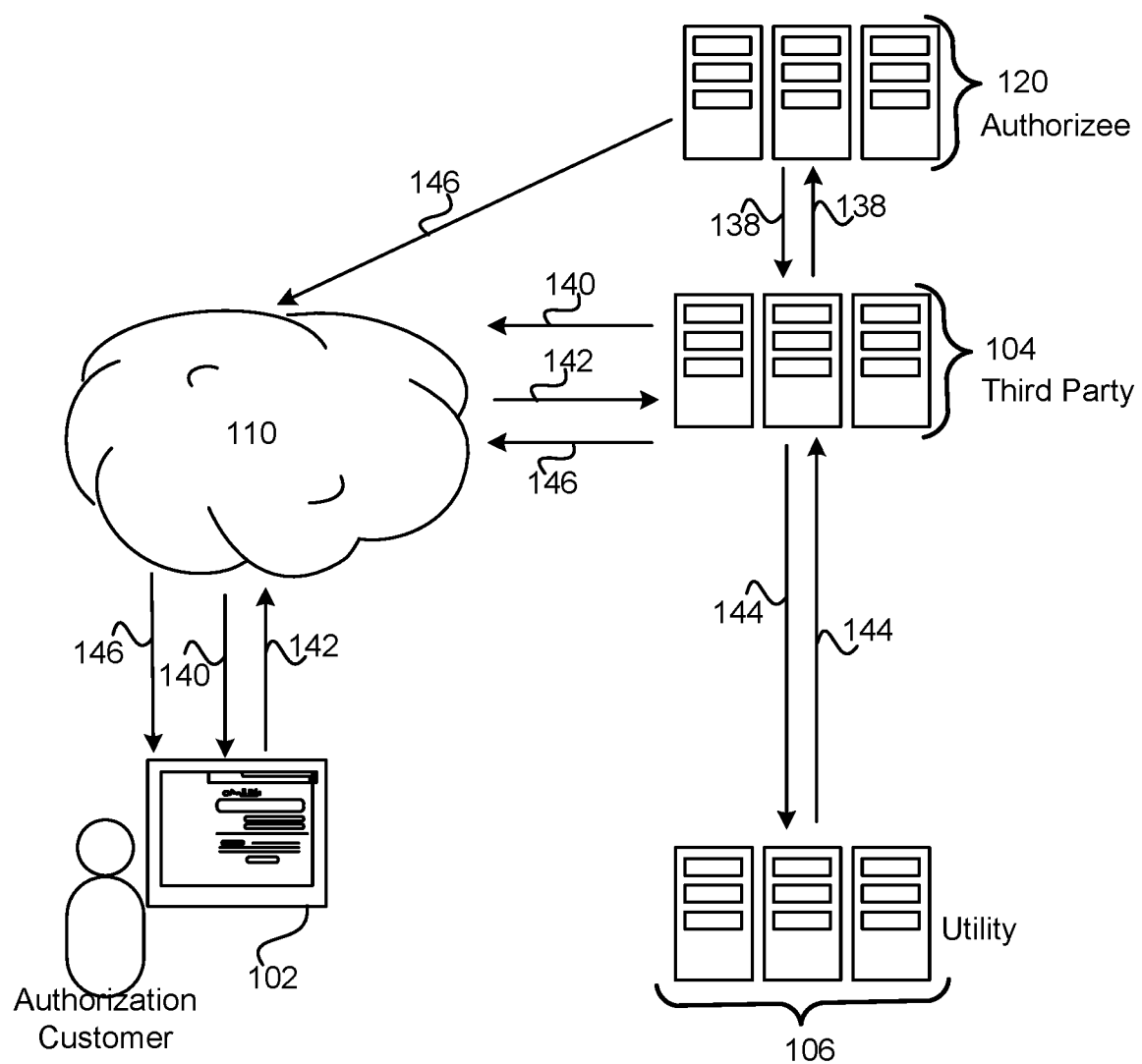
FIG. 1 shows an example interaction flowchart for authorization form generation and submission according to certain embodiments described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the disclosure to these particular embodiments. In other instances, well-known data structures, timing protocols, software operations, procedures, and components have not been described in detail so as not to unnecessarily obscure aspects of the embodiments of the disclosure.

Overview

Public and private utility companies such as electricity, water, natural gas, etc. may provide utility account holders the ability to access their rate and usage information online. This ability may be provided to allow utility account holders to monitor their usage of the utility services and change behavior, conserve resources, budget, participate in public purpose programs or any of various other reasons. Such ability may be further aided by smart meters which include networked computerized meters that may be in communication with the utility companies' back end servers. Through these smart meters, the utility companies can take accurate readings without sending meter readers to individual homes or businesses to read analog meters. These smart meters and back end networked servers also allow for data to be constantly updated, arrive accurately, and in a format that is able to be manipulated and analyzed.

Various companies may wish to access the residential or commercial utility customer or utility account holder information for any of various reasons, such as, but not limited to designing a solar panel solution, propose alternative battery arrangement, or any other various reasons. But to get to the individual utility account holder data, individual logins and passwords may be required by the utility company services. Once these login credentials are obtained, the data may be collected in its native format, and then converted into machine readable format in order to make automated or scaled data pulling possible.

This disclosure includes systems and methods to facilitate third party access to the utility company rate, meter or smart meter data for the utility account holder, including but not limited to the account holder's utility billing and usage data, by obtaining authorization via electronic and in some examples automated form. These authorizations may allow a third party to interact with the holder of the data, for example, a public and/or private utility company, on a utility account holder's behalf. These systems and methods may allow for dynamic generation and processing of different types of authorization and scope for interacting with utilities. These systems and methods can be used by third party service providers to obtain the authorization to act on a utility account holder's behalf to, for example, access, collect, store or share data, create a new online account, etc.

It should be noted that the description of the holder of the data as a utility company is meant to be exemplary and not limiting. Any kind of data storage can be accessed in these ways described here. It should also be noted that although typical data that the systems here are retrieving from data holders such as utility companies include PDF formatted bills and xml spreadsheet formatted power interval reports, any kind of data formatted in any way could be retrieved. The examples of bill PDFs and interval xmls are merely exemplary and not intended to be limiting in any way.

Authorization; Data Storage and Security; Collecting

The systems and methods described here will be described in three general categories: the authorization process of gaining authorization from the utility account holder authorizer so the third party middle system can access and move the data from the data holder or utility company; the storage and handling of the data including login and password information, as well as the underlying data that is the object of the data requests; and the collection of the data itself from the data holder, or the utility company's servers. The order in which these features are explained is not intended to be limiting.

Additionally, it should be noted that the architecture and systems described here are not designed to collect as much data as possible and then monetizing such data by selling it to fourth parties (often referred to as big data). Instead, the systems and methods here are designed for maximum security, maximum data privacy, ease of software maintenance, versatility of software architecture interface and targeting very specialized data to be obtained and utilized for specific purposes, e.g., utility usage and billing data from a utility company for specific utility account holders. The architecture and security built into the systems and methods reflect this targeted data solution.

Authorization Process

As explained above, in certain examples, a third party may request a utility account holder to allow the third party to access the utility account holder's underlying utility company data. This data could be billing data, meter data over time, rate data, or any other kind of data. Such third party may need the utility account holder's utility data to determine a solar plan for a residence, or an energy saving arrangement for a commercial utility account holder. Whatever reason the entity is asking for the utility account holder utility data, obtaining authorization to retrieve that data can be daunting. Each utility requires different things, the utility company systems are not set up for automated data retrieval, and the processes can be slow. Below are ways to help automate the authorization of data retrieval from a utility company or other data holder for individual utility account holders. These systems and methods are designed to accomplish legal, secure, synchronous, authorized access to energy billing and usage data.

In the example here, a third party is utilized, which may not be the original requesting party such as the solar party, but rather is an intermediary, middle, or accessibility coordinator. This third party may use the systems and methods herein to gain authorization, collect the data, and securely store and pass the data to the requesting party. FIG. 1 shows an example high level flow chart showing interactions among the utility account holder computers 102, middle facilitator third party servers 104 that coordinate the access to the utility data, the data holders such as the public utility servers 106, and an authorizee 120 which is requesting the data from the utility account holder, such as a solar company looking to find a potential utility account holder's utility usage data. The interactions may take place over any kind of network 110 such as the internet, with computers with processors, memory and data storage as described herein. FIG. 1 shows the flow of information for authorization generation and submission.

The arrows in FIG. 1 show the movement of data and communications among the component servers to obtain authorization to access the data. In some example embodiments the system seeking authorization, the authorizee 120 which is the solar company or entity looking for the utility data will submit a request 138 to the third party system 104 to begin the process. This request 138 may trigger the third party servers 104 to begin seeking authorization from the utility account holders 102 to access their utility data from the utility company 106, and process the data to make it machine readable for the authorize 120 to use.

For the third party 104 to begin the authorization process, first 140 the third party company that is facilitating the access of the data, generates an electronic authorization form at its servers 104 and delivers the form 140 via the network 110 to the utility account holder computer 102. Next, 142 the utility account holder, through their utility account holder computer 102 fills out and submits 142 the electronic authorization form back to the third party servers 104 via the network 110. Next, 144 the third party system 104 communicates with the utility servers 106 to validate the submitted authorization field information from the forms. Next, 146 a receipt may be sent to the utility account holder computer 102 by the third party 104 after the fields are determined to be valid. In certain embodiments, the authorizee 120 may send an authorization link 146 to the utility account holder computer 102 in order to facilitate the authorization process. The authorization link 146 may also be embedded.

Using the systems and methods here, the authorize 120, the entity requesting the data be shared by the authorizer or utility account holder, ultimately never has access to the utility account holder 102 login and password information as it is only handled by the third party 104 system. This arrangement increases security as the utility account holder 102 login data does not have to be moved or stored—except by the third party system 104 which is secure and encrypted.

Figure 2:
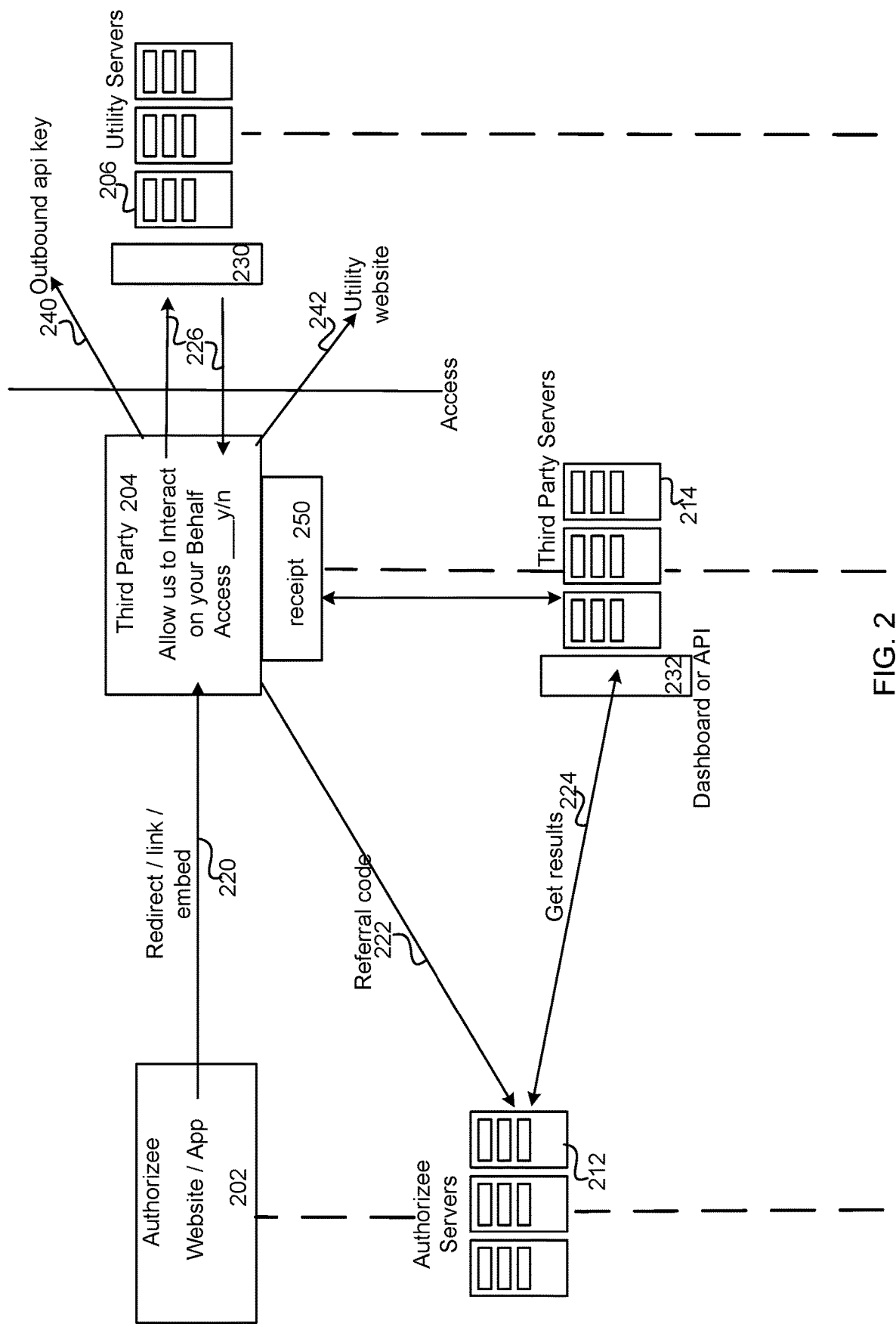
FIG. 2 shows another example flow chart for authorization according to certain embodiments described herein.

FIG. 2 shows another example flowchart showing more details of the authorization flow. In the example of FIG. 2, the Authorizee 202 sends a redirect or link 220 to the third party website 204 which asks permission to interact on the authorizer's (utility account holder's) behalf. Next, the third party system 204 interacts 226 with the utility servers 206 as described below, to retrieve 226 the data that is being sought. The third party systems 204 can then collect via script or otherwise obtain the data from the utility server 206 itself.

Once the data is obtained by the third party 204, a referral code may be sent 222 to the authorizee servers 212 and the data results may be retrieved 224 from the third party servers 214 through either a dashboard or an API 232.

A receipt 250 may be generated by the third party 204, 214 and also sent to the ultimate utility account holder so that they may revoke access to easily shut down their third party account and promptly stop the retrieval of data if and whenever desired. The receipt 250 may include various information, including but not limited to date and time, registration details, authorizee details, data collected and shared details, and revoke options (see FIG. 9 for examples).

In the embodiments described here, generally, three kinds of access may be utilized. One is login credential access through the utility website 242. A second type of access is to store an API key 240 to use as described above to access the data at the utility server 206. A third type of access is a direct access if the system has a pre-arranged agreement for direct access to the data. Regarding the direct method, in some examples, the utility 206 may install software 230 inside its firewall for the third party 204 to interact with to facilitate the movement of data. This may allow a direct access to the utility servers 206 by using any kind of identification number to identify the utility account holder to the utility 206. In such a direct access authorization situation, the third party system 204 would only need to identify for which utility account holder it is requesting data. Such identifier could vary from utility company to utility company but could be any number of things including but not limited to a utility account number, phone number, utility meter number, zip code, address, name, etc. In some embodiments, the direct access method may also utilize a two-step authentication process. Such a two-step process could be to email a code to known user email address, or text message to a known user phone number, and ask for such code to be inputted so as to prove authentication.

Although the system may work without the embedded software 230 inside the utility firewall, the utility company servers 206 may be stressed if the third party 204 has to enter the utility servers 206 front end to request data. The embedded software 230 solution may alleviate the pressure on the utility company 206 front end if implemented and may facilitate improved speed and security of data collection.

GUI Examples

In some examples, the authorization process may include use of an online authorization form, to be passed to the utility account holder to fill out and then return the form to the third party and then the utility company. Such a form could provide authorization to the third party to access the utility account holder's data. But because each utility company may ask for differing data in the authorization form, the systems and methods here allow for customized authorization forms to be created and used. In some examples, certain aspects of the forms may be pre-filled by the third party, thereby easing the burden on the utility account holder who is filling out the form to give authorization.

These systems and methods may include use of a computer server or cluster of servers that hosts, generates, serves, and/or processes the electronic authorization form (s). These servers can be controlled by the third party directly or be controlled by a hosting provider. When electronic authorization forms are submitted to the third party system, they may be automatically processed by the server, thereby easing the burden of processing and automating the process. This allows access to the utility account holder's data by the third party, in an automated manner, and allows data to be pulled from the utility company's systems for multiple utility account holders on a regular, streaming or constant basis.

The electronic authorization form generated and served by the system may take the form of a webpage that can be accessed over a network such as the Internet. The systems and methods may be able to serve and/or distribute different versions of the electronic authorization form by generating unique Internet address locations (URL). The system allows the URL to be customized by the authorizee via a web interface or Application Program Interface (API). Multiple URLs can load the same electronic authorization form.

The electronic authorization form design and styling can be customized by an authorizee. For example, an authorizee may insert their brand's logo at the top of the form or change the font of the form to match the font of the rest of their website. An authorizee can also pre-populate the fields of the authorization form, except for the digital signature field. Pre-populated fields may be displayed for the utility account holder to review and to modify if desired. This pre-population feature can make the utility account holder user experience of digitally signing and submitting the electronic authorization form easier because it means they potentially only have to review the pre-populated fields and then fill out the digital signature field. A pre-populated electronic authorization form can be accessed by adding the pre-populated fields to the URL parameters. The system can also generate a unique URL that is an alias for the pre-populated fields, so that the URL is shorter and more manageable. A third party can customize the unique URL for the pre-populated form.

The electronic authorization form may be generated in a dynamic format such that the user can select their utility and then be shown the fields needed to perform the authorized interaction. This dynamic format may be agnostic in that it may allow the same base electronic authorization form to be compatible with multiple utilities, even if the utilities have different requirements of authorization or access for similar interactions. For example, to collect interval history for natural gas usage, one utility may require OAuth authorization to perform this data collection interaction, and another utility may require login credential authorization to perform the same data collection interaction. This system may be able to show a utility account holder an electronic authorization form with the correct sub-option fields depending upon which utility with whom they are a utility account holder.

For some utilities, there may be multiple ways, with multiple sets of fields, to grant authorization. For example, a user may be able to submit either a set of login credentials or their account number and meter number in order to authorize an interaction of collecting their utility billing history. The system can generate the electronic authorization form with a toggle to allow the user to use either set of authorization fields. A third party can also customize the form to restrict the sets of fields that are available to the utility account holder to toggle. For example, for the interaction of collecting electric meter interval history, a third party may customize the electronic authorization form to only offer Green Button OAuth as the authorization fields, even though a set of login credentials and auto-registration fields are also acceptable to perform the interaction.

The electronic authorization form lists the specific interactions to be performed after the authorization form is submitted. The form may have a default set of interactions, which can be customized by either the utility account holder who is submitting the authorization or the third party that is being authorized to perform the interaction.

Listed interactions can include, but are not limited to, collecting utility account and service details (account number, tariff name, billing address, etc.), collecting billing history, collecting usage history (e.g. kWh intervals), submitting an interconnection application to the utility, submitting payment to the utility, or changing the utility account holder's tariff (e.g. rate schedule) to another tariff. This list of authorized interactions can also have a lifetime scope associated with it, such that the interactions can only be performed within a limited time span or a limited number of times. For example, a utility account holder may customize the lifetime scope of the interaction to collect the billing history as a one-time collection, which would only authorize the third party to perform the interaction once.

The electronic authorization form can also list sub-interactions that may be authorized in order to perform the main list of authorized interactions. These are interactions necessary to perform the main authorized interactions, but do not have results that are relevant to the utility account holder or third party. For example, if the main authorized interaction is to collect a utility account holder's billing history, two sub-interactions that may be listed to be authorized may include: (a) authorization to register an online utility account on the utility account holder's behalf; and (b) to then login to that online utility account on the utility account holder's behalf. Another example, if the utility account holder does not remember their login credentials, an authorized sub-interaction may be to submit a password reset request on behalf of the utility account holder to the utility. These authorized sub-interactions can be customized by utility account holder or the third party, and may be logically chained to the main interaction. If a utility account holder customizes the sub-interactions to remove a specific type of interaction, the main interaction may also be removed because it may no longer be possible to perform that interaction if the sub-interaction is removed.

Sub interactions may include things such as a "re-captcha" embed tunnel. This kind of feature may utilize a desktop sharing feature to port a text recognition screen back to a human user to interact. Such text recognition screens act as security features to stop bots from accessing a program by showing a confusing image with embedded text that is hard for machine readers to determine. A human can more easily determine the text so a desktop sharing feature can allow for that human interaction just for this authorization or security feature. Other authorization features may be utilized.

Figure 3A:
FIG. 3A shows an example default generated electronic authorization form according to certain embodiments described herein.

Below are non-limiting examples of authorization forms as utilized herein. FIG. 3A shows an example graphical user interface (GUI) screen of a default generated electronic authorization form which may be used in certain examples described herein. Such a form may be generated by the system servers and sent to the utility account holder computer for viewing and interaction. The example form is shown divided into three sections: contact information and scope of interactions 310, authorization fields 320, and digital signature 330. It should be noted that the authorization form examples in FIG. 3A-10 could be arranged in any manner and could include less or more components or features and in any combination, the components are shown as examples only.

FIG. 3B shows an example GUI of dynamic form generation for an example utility. The system may react to input from the utility account holder and dynamically change the form, depending on the input to various fields. For example, the utility selection area 340 is shown as a drop down but could include any kind of data entry methods. Depending on what the utility account holder user inputs into the utility selection area 340, the system may analyze that input and populate the GUI with other various fields, for example, authorization fields relevant to the input utility 350.

FIG. 4 shows an example GUI with a stylized form with authorizee logo 420. The screen shows an example layout of an electronic authorization form that has been customized by an authorizee. The GUI includes many component parts including but not limited to a custom URL 410 for that customized form, a custom logo 420 for the form, a custom contact information and scope 430 for the other interactions. The GUI also includes an authorization 440 specifically listing the parties to be authorized to interact on the utility account holder's behalf.

FIG. 5 shows an example GUI with a customization interface for the authorizee. The FIG. shows an interface 510 that allows the authorizee to customize the URL for the electronic authorization form. The interface 520 also allows for customizing. For example customizing may optionally include who to contact via email after a utility account holder as submitted an authorization form. The interface 530 may optionally allow for customizing where to redirect the utility account holder after submission.

Figure 6:
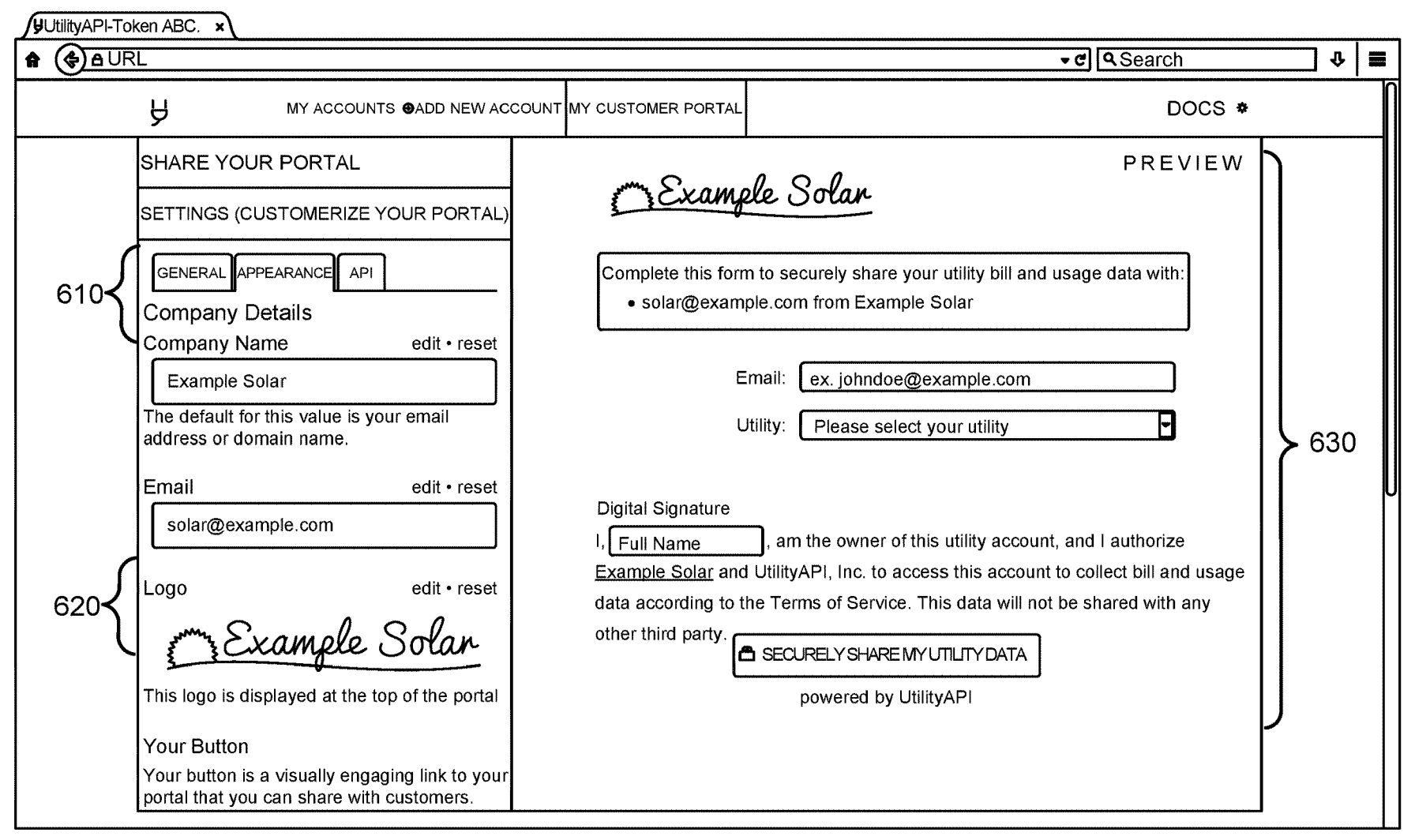

FIG. 6 shows a continued example GUI of a customization interface for the authorizee. FIG. 6 shows the how the customization interface is split over multiple categories 610. The FIG. shows how the authorizee can customize their authorization form with branded logo 620. Also shown is an example preview of the electronic authorization form 630.

FIG. 7 shows an example GUI with a pre-populated form. FIG. 7 shows the unique link 710 for the pre-populated form. In the example, "URL" is shown where the unique link would be displayed for the user. Also shown are the pre-populated fields 720. The information used to populate these fields could come from any number of databases including those from the utility company, from the authorize company, from the utility account holder user or some third source such as an internet search. It should be noted that pre-authorization forms such as those in FIG. 7 do not have to be displayed in a browser window. In some examples, the forms can be generated and sent through applications such as a smartphone or tablet app.

Also, in certain examples, the ability to customize the scope of what a utility account holder user wants collected can be changed as described above. FIG. 7 shows an example but other examples my include editable lists of billing data, time limited, or other options to limit the scope of data that is collected.

FIG. 8 shows an example GUI with customization interface for the pre-populated form view. FIG. 8 shows the editable unique URL 810 for the pre-populated form. Also shown is the pre-populated fields that have been saved by the third party 820. It should be noted that FIG. 8 shows that the GUI is in prefill mode 830 as indicated. In some example embodiments, once the authorization form is submitted, the system can automatically notify the third party.

Figure 9:
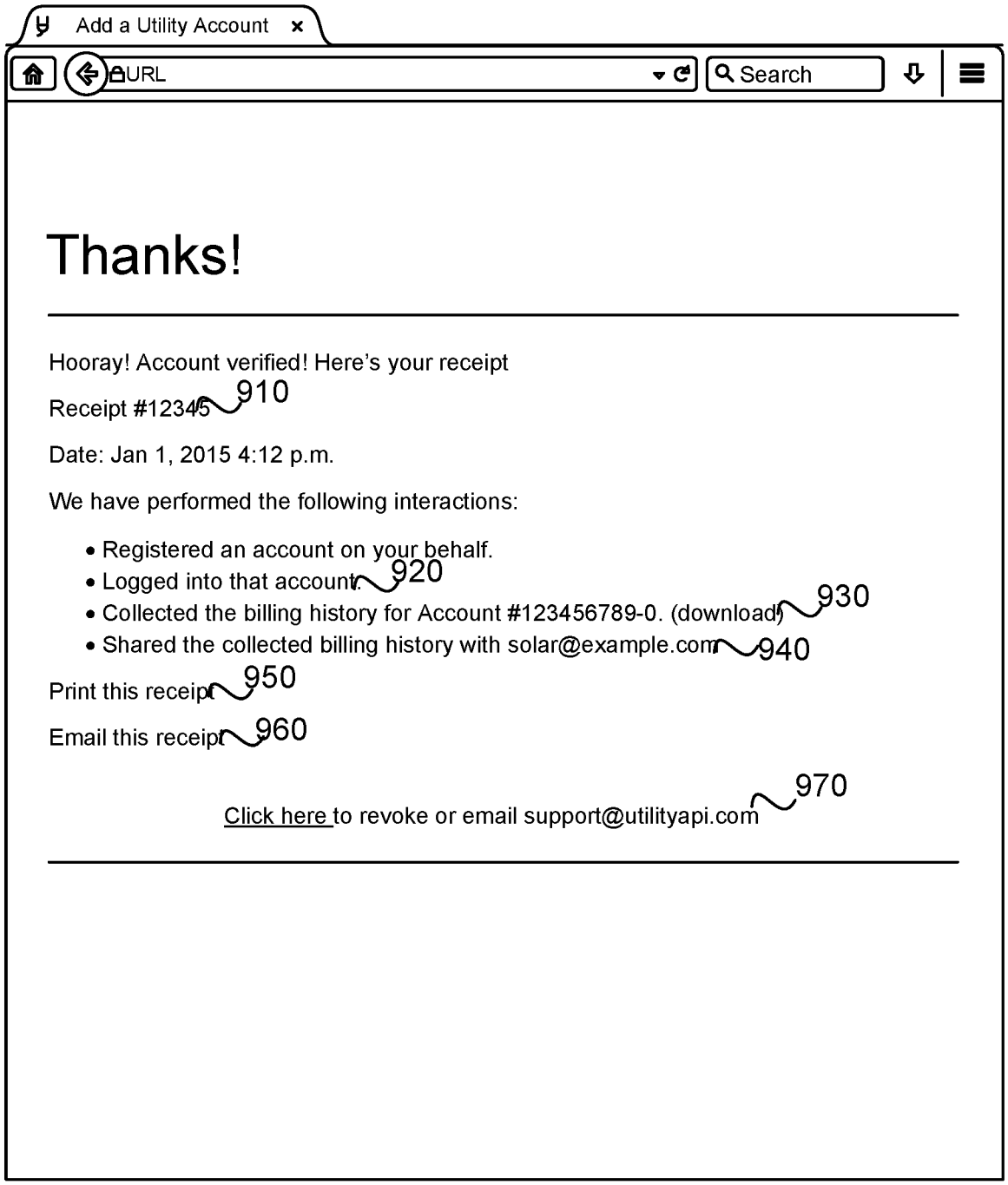
FIG. 9 shows an example generated receipt after submission according to certain embodiments described herein.

FIG. 9 shows an example GUI of a generated receipt after submission. FIG. 9 shows the unique receipt number 910 for the submission. Also shown is the overview of what interactions were performed as part of the submission 920. FIG. 9 also shows the ability of the system to allow for access and download of the results of the interaction 930 as well as the record of other interaction 940 such as sharing the data with the authorizee. FIG. 9 shows features that allow a user to print the receipt 950 and the action to email the receipt 960. Another feature shown in FIG. 9 is the revoke link 970. Any kind of link could be used to indicate that the user wishes to revoke his or her authorization to access their utility data.

FIG. 10 shows an example GUI of generated interaction results viewable by the authorizee. FIG. 10 also shows the delayed interactions that the third party can trigger 1020. Such delayed interactions could be delays in data retrieval which are inherent in certain collection methods such as manual collection or the built in 24 hour delay when using the Green Button systems as described below.

FIG. 11 shows an example GUI of a receipt in API format in csv data structure. The format, in certain embodiments, is a format that is able to be machine readable to automate collection of data. Data can also be made available through the API via JavaScript Object Notation (JSON).

Storage and Handling of the Data Examples

Personal data such as logins and passwords and also underlying data regarding energy usage is highly sensitive and worthy of robust security measures. Because of the nature of the sensitive data the systems and methods here retrieve, analyze and utilize, the architecture used to handle, store and utilize it is designed for maximum security. Features such as code isolation, strict decryption and write permission usage, and immediate encryption are just some of the features employed here to maintain a highly secure structure as described below.

Figure 12:
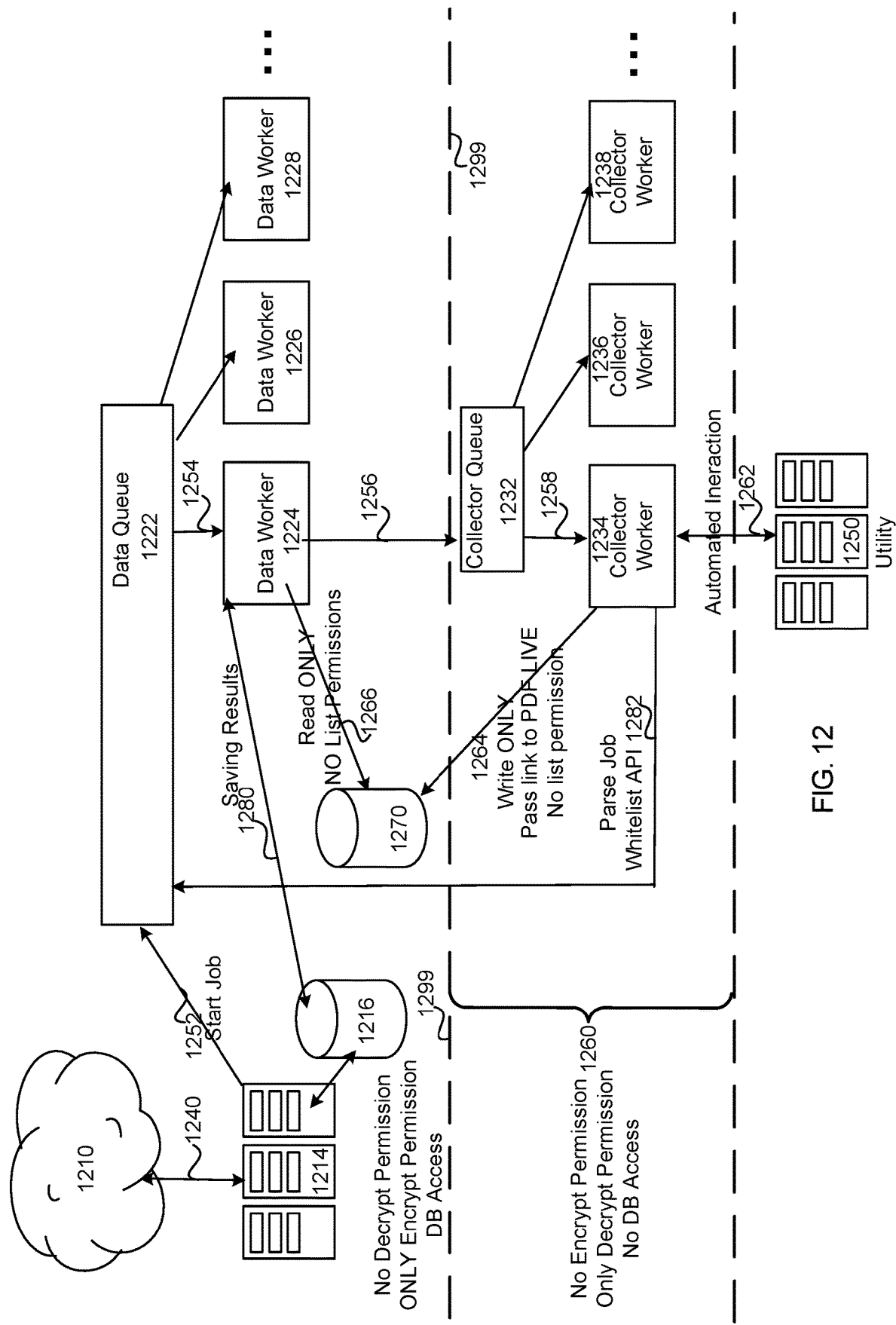
FIG. 12 shows an example security architecture according to certain embodiments described herein.

FIG. 12 shows an example software architecture of the storage and handling of the data including the login/password information as well as the data that is the object of the request. Such an architecture may be referred to as split stack or isolated code format. The architecture is arranged for maximum security to minimize the amount of code that is exposed, thereby limiting the attack surface that could be used to import malicious code, directly attack or otherwise compromise the security of the system and expose data. Not only are the attack vectors limited, as explained below, but the system is arranged for targeted data retrieval. Many security attacks attempt to retrieve massive amounts of data at one time, thereby providing a large amount of data quickly while the security vulnerability is exploited. The architecture described here is designed to only retrieve specific requests, one at a time, and target the obtained data for a specific purpose. This minimizes the amount of data that could be retrieved in a malicious attack as well.

One interaction point that the system 1214 has with the outside is through the internet 1210. This data communication 1240 is where the system 1214 imports or receives the login and password information from the utility account holder of the utility company that wants the authorizee to see his or her utility data as described above. In some embodiments, this is via the forms discussed above. The system 1214, immediately upon receipt of the login and password over the internet 1210, encrypts and stores the login and password information in a secure database 1216. This database 1216 may be encrypted at rest by default in case of a power outage or system shutdown. Otherwise, while running, the database 1216 only stores encrypted passwords and logins, and never unencrypted passwords and logins.

It should be noted that the code architecture is split or isolated, and in the example of FIG. 12, everything depicted above the line 1299 has no decrypt permission, only encrypt permission and has username/password database 1216 access. Everything between the lines, in the 1260 section, has only decrypt permission but no database 1216 access as described in detail below. This means that even if the system is hacked from the internet side 1210, the only thing the attack can retrieve is an encrypted blob of usernames and passwords. The hacker would have no decrypt permission for the data, so could not decrypt the usernames or passwords, even if they retrieved them.

Referring again to FIG. 12 once the system 1214 receives a request to start a job 1252 of data retrieval, it sends the request to a data queue 1222 as the system is asynchronous.

The data queue 1222 sends the request 1254 to a data processing worker 1224. The data queue 1222 could utilize any number of data workers 1226, 1228 etc. for the various requests that it receives. Once the data worker 1224 receives the request, it may send the request 1256 to a collector queue 1232. Once again, so far, all of these queues and workers are above the 1299 line and therefore only have encrypt permission. The collector queue 1232 sends its request 1258 to a collector worker 1234. Any of various collector workers could be utilized 1236, 1238, etc.

It should be noted that although the data queue 1222, data workers 1224, 1226, 1228 and collector queue 1232 with its collector workers 1234, 1236, 1238 are shown with arrows pointing to the third party servers 1214, these aspects are abstractions of what is happing at the software level inside the servers 1214 themselves. Thus, in certain embodiments, these features are all running in the third party servers 1214 or component servers that may be physically isolated as described here. In some embodiments, virtual machines may be used outside of the third party servers 1214 to the same effect.

Referring still to FIG. 12, as indicated by the line 1299, all of the collector workers 1260 have permission to decrypt but have no login and password database 1216 access. The code for the collector workers is isolated from the code for all of the components listed above. The collector worker 1234 tasked with the request for data, collects the data 1262 or otherwise obtains the data from the utility server 1250. The collector worker 1234 may then store the raw data in storage 1270, which, being above the 1299 line, may be encrypted.

In some example embodiments, the collector worker 1234 immediately begins writing data to the raw storage system 1270 as it is being retrieved from the utility 1250 but does not process the data. Such immediate writing is sometimes referred to as live or real-time and enables the system accessing the data to see it populate as it is being collected, thus reducing lag time for data access. In some examples, this information is from a PDF obtained from the utility company which includes billing information about a utility account holder, or an xml format of utility power usage.

The collector worker 1234, because of the split stack or isolated system, has write-only privileges to the encrypted storage 1270 as a security measure. In such an arrangement, if an attack came from the utility side 1250, the collector worker 1234 has no encrypt permission and no login/password database 1216 access. It 1234 can only write to the storage 1270 as explained above. It could not be used to read anything such as logins or passwords, even if it did have login storage access, which it does not in these examples.

This architecture below the line 1299 provides only the minimum amount of code needed to access and interface with the utility 1250 with decrypt permission by using a separate code stack. In such examples, libraries running everything above the line 1299 may be more numerous to analyze the data, parse the data, store the data, etc. The libraries running in the decrypt permission zone 1260 are fewer, solely language interpreter and collection scripts to collect the data from the utility 1250.

The collector worker 1234 can then signal 1282 to the data queue 1222 that it has saved something to the data storage 1270. These signals may be the white listed signals described below. The data queue 1222 can then instruct a data worker 1224 to save the parsed results 1280 in the database 1216. This allows the server 1214 to show the parsed data to the utility account holder, or authorizee as described here.

Once the data is written to the storage 1270 by the write only collector worker 1234, the data worker 1224 may read the data 1266 from the storage 1270, again, as it is being written. Again, the data worker 1224 here only has read privileges and not any list permissions, which limits its access to only what it specifically requests, and not a larger list of all the logins that a malicious attack may try to request. Such arrangements use a communication layer 1262 that is as specified as possible.

As another security measure, in some examples, white lists are used to ensure that only specifically allowed data comes back to the system. Malicious or spurious data such as malicious code, would not be on the white list and would therefore be rejected.

Another security measure is a security log. The log may be used to store information about what data was written when and by which developer account. For example, if an admin edits data, the system retains a time stamp, the admin identifier and records that information for analysis.

Collecting Data

In FIG. 12, the interaction 1262 between the collector worker 1234 and the utility server 1250 is shown. This interaction 1262 to collect data can take any of various forms. In some examples, as described above and in FIG. 2, there are different ways to obtain the underlying data, once given permission to the data at the utility server or other data server. One example is a direct access through software running on the server 1250 itself, and the other is by collecting data through the logged in web interface. Some examples may utilize combinations of direct access and web interface collection, depending on the arrangement made with the utility company or other data holder, or the architecture provided.

In examples that utilize collecting data, the systems and methods here may utilize a menu of options that can be used to collect the data from the data holder, which in some examples is a utility company. Such a menu of options may be referred to as multi service collection—multiple collection services for one login or other access credentials, such as API keys.

In some examples, there may be multiple options, or a menu of options that can be used to collect data, because each data holder, or utility company, may be arranged differently. The accessibility of the underlying data in individual data holders, such as utilities, may drive the menu of options. Below are non-limiting examples of some of the menu of options that may be used by the systems here to collect data from the utility company. It should be noted that the menu of options may not only be customized for the individual data holder or utility that the data is being collected from, but that the systems may employ smart methods in utilizing the various menu options. For example, the system may first try a method, then employ another method if the first method is unsuccessful or takes too long. The system may skip collecting data it has previously received and concentrate on data it has not yet received. The system may automatically repeat attempts to collect data if the utility system does not respond, the data holder site crashes or otherwise times out. The system may also report errors and even collect data for debugging purposes and report them to the utility company to improve the utility or data holding server.

The menu of options includes a series of framework tools isolated from one another. Each utility can be independent in format and function. This architecture is utilized because the object of these systems is not to collect any and all data possible, the systems and methods are utilized to target specific data for a specific account. Therefore, the collection functionality is tailored to be robust and redundant to find the specific data.

Some menu options of methods to collect data include, but are not limited to: utilizing a an API; utilizing a Green Button Connect API; utilizing another website such as a utility vendor; using manual requests using authorization forms; using an interactive portion of a utility website; utilize an Electronic Data Interchange (EDI) system to subscribe to data feeds. Manual collection, such as copy and paste, may be used as well.

Green Button download my data (DMD) refers to a program that was coordinated by the US government to standardize access to utility usage data for utility account holders. The system includes a website in the utility company website that allows users to login and request their usage data in an .xml or spreadsheet format. One issue with DMD is that individual logins are required to access the data and it is not automated. However, the systems may automate the collection of data from DMD.

Automated access to the utility data was attempted by Green Button Connect my Data (CMD). This is a handshake between a third party and a utility company to attempt automation retrieval of the utility data. Third parties are offered in the website and may be selected. The third party website redirects to the utility server which sends an API key in exchange. The third party server may send a request to get data using the API key to the utility server which returns the data in an xml format push after a 24-hour interval. This CMD may be utilized by the systems and methods here as a way to obtain data.

It should be noted that the scope of the data collection may be tailored in this exchange. This limits the authorization and data push. And in some examples, this arrangement may not be originated from the third party, but only from the utility side. In some examples, third party preselection may be used, to allow the utility account holder to see a preselected choice of a third party on their own list by redirected link. In some examples, the redirect does not work if the utility account holder isn't first logged into their utility website.

Vendor website refers to browser popup to log into the utility site, and download data from the vendor section in csv, xml or graphs. Other websites with different logins may be used as well. EDI is a format to receive a pushed data set that is requested. Auto registration may be used as well, where the utility account holder allows the third party to register a new account on behalf of the utility account holder user, which may result in duplicative accounts at the utility but allows the third party to collect without sharing the main account password. Direct access authorization may also be used—based on the concept that knowledge of the specific account number evidences authorization for direct access. A security arrangement may be made so that the utility company allows automated access to a database with information accessible by an identifier such as an account number, meter number, etc.

As different data is available through different ways described here. Some methods allow for just utility usage interval data, some billing data, others both or other data. Some example embodiments allow the system to scope the inclusion of the results of the interaction into a dataset such that the results are anonymized and not attributable to the customer.

Non-Utility Authorization Examples

It should be noted that the systems and methods here could be tailored to gain authorization and obtain data in implementations that are not for utility usage data. For example, the electronic authorization form can also list other interactions to be authorized that are not interactions with a utility company. The form can list an interaction to be authorized that the results from the interaction with the utility be shared with another party. This other interactions list allows the utility account holder to be informed and explicitly authorize what interactions are taken with the results of the interaction with the utility. Another example, the form can list an interaction that the results of the interaction with the utility be combined into a pool of results from other utility account holders as to form an aggregate dataset. These listed other interactions to be authorized can also specify whether the results to be shared will be anonymized (i.e. personally identifiable information removed).

The electronic authorization form that the system generates is compatible with multiple modes of deployment. The form is able to be served as a standalone website. This allows a third party to email or text the unique URL for a generated form to a utility account holder. The form may also be able to serve as an embedded iframe on another party's website. This may allow a third party that has multiple websites to embed and use the same authorization form on the multiple websites. Because the fields of the generated authorization form can be pre-populated via URL parameters, a native server, desktop, or mobile application can generate a pre-populated electronic authorization form inside the application.

All of the above customizing interactions that can be performed by the third party (styling, custom form URLs, pre-populated form URLs, authorization level, scope customizations, and lifetime customizations) can be performed via application program interface (API). This allows the third party to generate or modify generated electronic authorization forms programmatically. Third parties are able to include these API requests in their internal software so that new electronic authorization forms can be generated on-demand when a utility account holder wants to have the third party perform an interaction with the utility. The generated electronic authorization form can also be retrieved and submitted via API. A utility account holder may have a system (e.g. a native mobile app) that will programmatically request an electronic authorization form and submit it with the required fields from the utility account holder (notably the digital signature) via API.

When the utility account holder fills out the electronic authorization form and submits it to the system servers, the servers will then perform an automated validation that the submitted information is correct and is sufficient to perform the interactions that were authorized. If the system finds that any of the submitted information is invalid, the system can generate an edit form that will be returned to the utility account holder to fix the invalid fields. For example, if the login credentials given are found not to be valid, the system will generate an edit form that will be returned to the utility account holder asking for valid login credentials, which the utility account holder can then re-submit to the system.

After submission the system is able to notify the third party of an electronic form submission. The notification can be in the form of an email to a preset email address. The notification can also be in the form an HTTP request (i.e. webhook) that is sent to a preset URL for the third party by the system. The notification can also be in the form of a redirect that occurs after the electronic form is submitted by the utility account holder. The redirect action will redirect the utility account holder to a preset URL for the third party that also has a unique set of parameters in the URL specific to that utility account holder.

After submission the system can also show the utility account holder a receipt of the submission with a unique identifier for the submission. The receipt can contain information about the submission (date, time, etc.), the list of authorized interactions and sub-interactions, and the results of the interactions, if available. This receipt is, by default, displayed as a webpage, but can be printed in a printer-friendly format and can also be emailed to the utility account holder. The receipt is also available to be requested via API.

The system can populate the receipt with the records and results of the authorized interactions. This population can happen immediately if the interactions are automatically performed and the results are immediately available. If the interactions are performed at a later time, the receipt can show the results as pending until they are performed. The third party can also view the receipt and results of the submission through their own website interface or via API. If an authorized interaction is not immediately performed, but can be automatically performed given the authorizee triggering the interaction, then these interaction trigger options are displayed in the authorizee interface. The interaction trigger options can also be retrieved via API. An authorizee may trigger an interaction that has a trigger option via their web interface or via API.

Computer Examples

Figure 13:
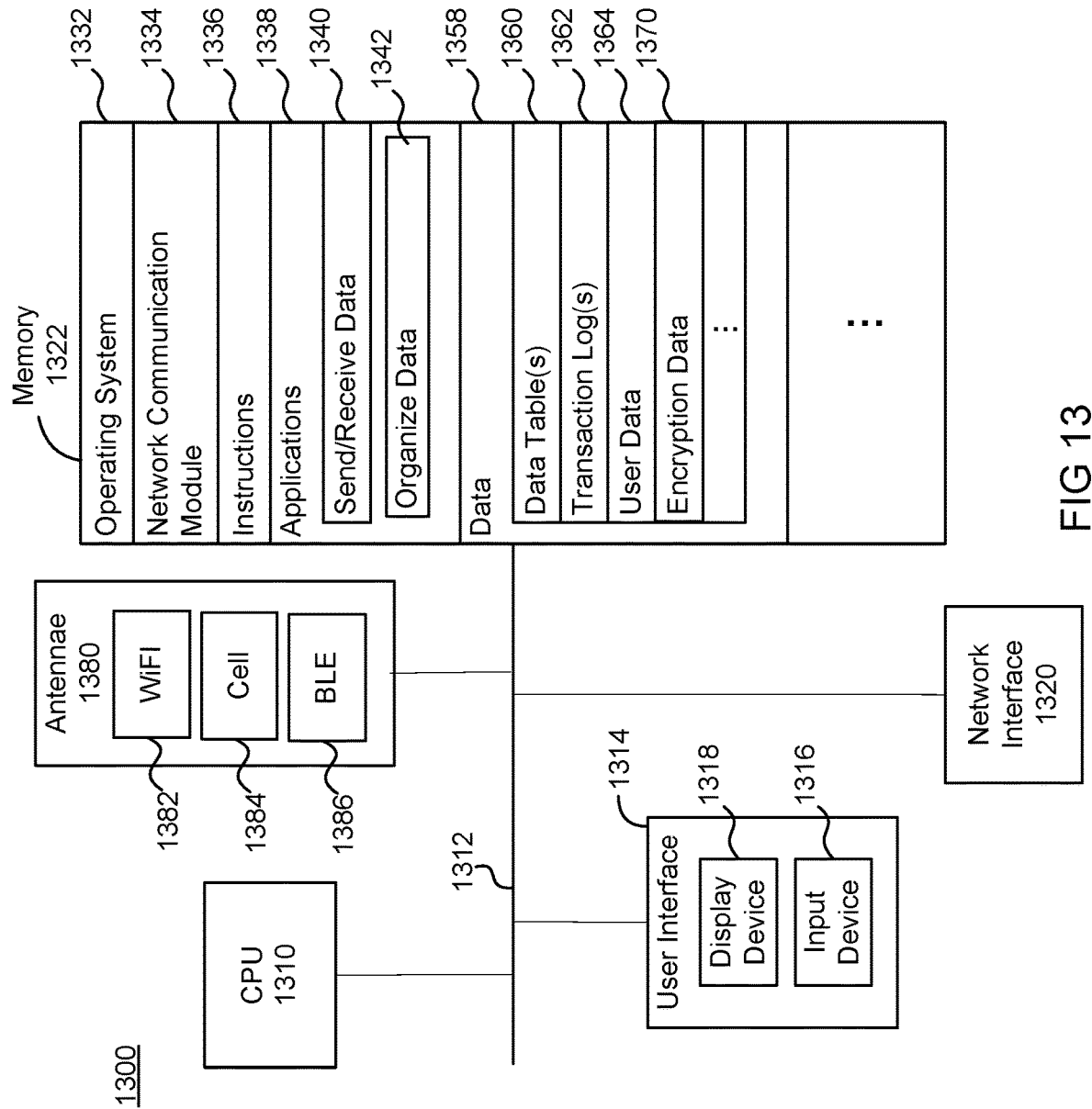
FIG. 13 shows an example computer diagram which may be used to practice the disclosures here.

FIG. 13 shows an example computer 1300 hardware which may be used to practice the disclosures described herein. The computer architecture and component parts are merely exemplary and are not intended to be limiting. Any of various computers with various components may be used. Such computers may be used as the back end servers of the system itself, or could be the utility account holder facing computers such as the smartphones, laptops, tablets, phablets, wearable such as glasses, bracelets, watches, etc. Such computers may include components such as a processing unit (CPU) 1310 which communicates over a bus 1312 or other communication path with other components such as a user interface 1324. The user interface may include a display 1318 and input component 1316 as well. Such a display may be a screen and input device may include the touch sensitivity of the screen. Some examples include a keyboard, mouse, gesture sensor, proximity sensor, camera, buttons, or other input devices. The computer also includes a network interface 1320 used to communicate with other computers over a network as described above. The computer 1300 also includes a memory 1322 which may include aspects such as an operating system 1332, network communication module 1334, instructions 1336 and applications 1338 such as applications to send/receive data 1340 and organize data 1342. Data 1358 may be stored in a table 1360, transaction log 1362, as user data 1364 and even as encryption data 1370. Any of various combinations may be used along with other computer components and/or features. Some embodiments include antennae 1380 including WiFi 1382, cellular 1384 and Bluetooth Low Energy (BLE) 1386 or other short range communications such as Near Field Communications.

Conclusion

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The computer may be a personal computer or other type of work station or terminal device. The structure, programming and general operation of such computer equipment and as a result the drawings is generally well known. The hardware elements, operating systems and programming languages of such equipment are conventional in nature.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications.

Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM, a EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Accordingly, the specification and FIGS. associated with these embodiments are to be regarded in an illustrative rather than a restrictive sense, and all modifications are intended to be included within the scope of the claims described below. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A system for network interaction, comprising:
 a computer server with a processor and memory in communication with a network and a data storage, the computer server configured to run two separated split stacks, each with isolated code
 the first stack with isolated code, including,
  a data queue to receive a job and pass the job to one of a plurality of data workers,
  wherein the plurality of data workers have encrypt permission but not decrypt permission;
  the data worker to pass the job onto a first collector queue;
 the second stack with isolated code, including, a second collector queue to receive the job and pass the job to one of a plurality of collector workers;

the collector worker to, interact with a data holder and retrieve data regarding the job;

retrieve the data regarding the job; and cause storage of the data regarding the job in an encrypted storage, wherein the plurality of collector workers only have decrypt permission and not encrypt permission, and wherein the split stacks and collector queues prevent malicious mass data requests, wherein the server generates a receipt upon retrieval of the data regarding the job, and wherein the receipt includes date, time, registration details, authorizee details, data collected details, data shared details, and revoke options.

2. The system of claim 1 wherein the server is further configured to receive over the network an authorization form from a utility account holder.

3. The system of claim 2 wherein the authorization form includes a login and password to access an account at the data holder for the utility account holder.

4. The system of claim 3 wherein the computer server encrypts the login and password before storing it in the data storage.

5. The system of claim 1 further comprising, the data worker is further configured to read the data regarding the job in the encrypted storage as the data regarding the job is being written by the collector worker.

6. The system of claim 1 further comprising, the collector worker is further configured to parse the retrieved data regarding the job to the data queue through a whitelist application program interface.

7. The system of claim 1 further comprising, the data worker is further configured to cause storage of the results in the data storage.

8. The system of claim 2 wherein the data holder is a utility company.

9. The system of claim 1 wherein the data regarding the job is one of utility billing information or utility power usage information.

10. The system of claim 2 wherein the authorization form includes pre-filled information and a digital signature block.

11. The system of claim 10 wherein the authorization form includes sub-options including at least one of time limited, data scope limited, account registry, share limited.

12. A computerized method of retrieving authorized data, comprising:

by a computer server with a processor and memory in communication with a network and a data storage, the computer server running two separated stacks each with isolated code and, receiving, over the network, an authorization form from a utility account holder;

encrypting a login credential from the authorization form and storing the encrypted login credential in the data storage;

sending a job to a data queue in a first stack, the data queue passing the job to one of a plurality of data workers in the first stack;

receiving the job at the data worker in the first isolated code stack from the data queue in the first stack, the data worker passing the job onto a collector queue in a second isolated code stack;

receiving the job at the collector queue in the second isolated code stack, the collector queue passing the job to one of a plurality of collector workers in the second isolated code stack;

receiving the job at the collector worker in the second isolated code stack, the collector worker interacting with a data holder and retrieving data regarding the job from the data holder;

causing storage of the retrieved data by the collector worker in the second isolated code stack in an encrypted storage in the first stack, wherein the two separated stacks prevent malicious mass data requests, generating, by the server, a receipt upon retrieval of the data regarding the job, and wherein the receipt includes date, time, registration details, authorizee details, data collected details, data shared details, and revoke options.

13. The system of claim 12 wherein the second isolated code stack has no encrypt permission.

14. The system of claim 12 wherein the first isolated code stack has no decrypt permission.

15. The system of claim 12 further comprising, by the collector worker in the second isolated code stack, parsing the retrieved data regarding the job to the data queue in the first isolated code stack through a whitelist application program interface.

16. A method of retrieving authorized data, comprising:

by a computer server with a processor and memory in communication with a network and a data storage, the computer server running two separated stacks each with isolated code, receiving, over the network, a request for data regarding a utility account holder;

sending, over the network, the utility account holder an authorization form to access the data;

receiving, over the network, the authorization form from the utility account holder;

encrypting a login credential from the authorization form and storing the encrypted login credential in the data storage;

sending a job to a data queue and data worker in a first isolated code stack;

sending the job to a collector queue and collector worker in a second isolated code stack;

retrieving data regarding the job from a data holder by the collector worker in the second isolated code stack; and causing storage of the retrieved data by the collector worker in the second isolated code stack in an encrypted storage in the first isolated code stack, wherein the two separated stacks prevent malicious mass data requests, generating, by the server, a receipt upon retrieval of the data regarding the job, and wherein the receipt includes date, time, registration details, authorizee details, data collected details, data shared details, and revoke options.

17. The method of claim 16 wherein the authorization form is accessed by a unique URL.

* * * * *